Jan. 10, 1967 M. A. ZINIUK 3,296,862
FLUID LEVEL MEASURING APPARATUS
Filed Oct. 2, 1963 2 Sheets-Sheet 1

INVENTOR.
MICHAEL A. ZINIUK
BY
Ward, Neal, Haselton, Orme & McElhannon
ATTORNEYS Jan. 10, 1967   M. A. ZINIUK   3,296,862
FLUID LEVEL MEASURING APPARATUS
Filed Oct. 2, 1963   2 Sheets-Sheet 2
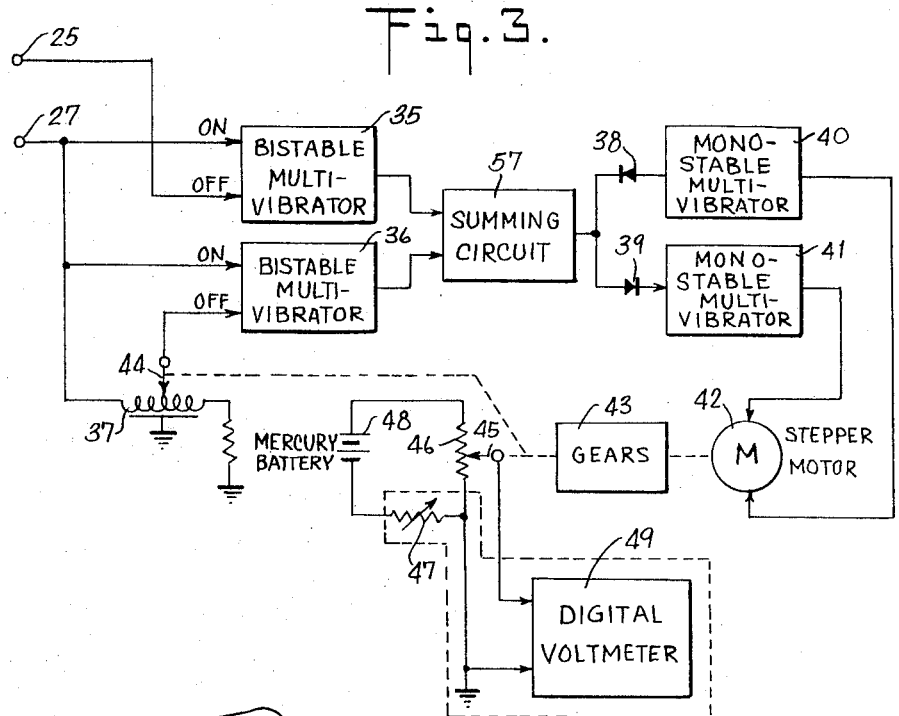
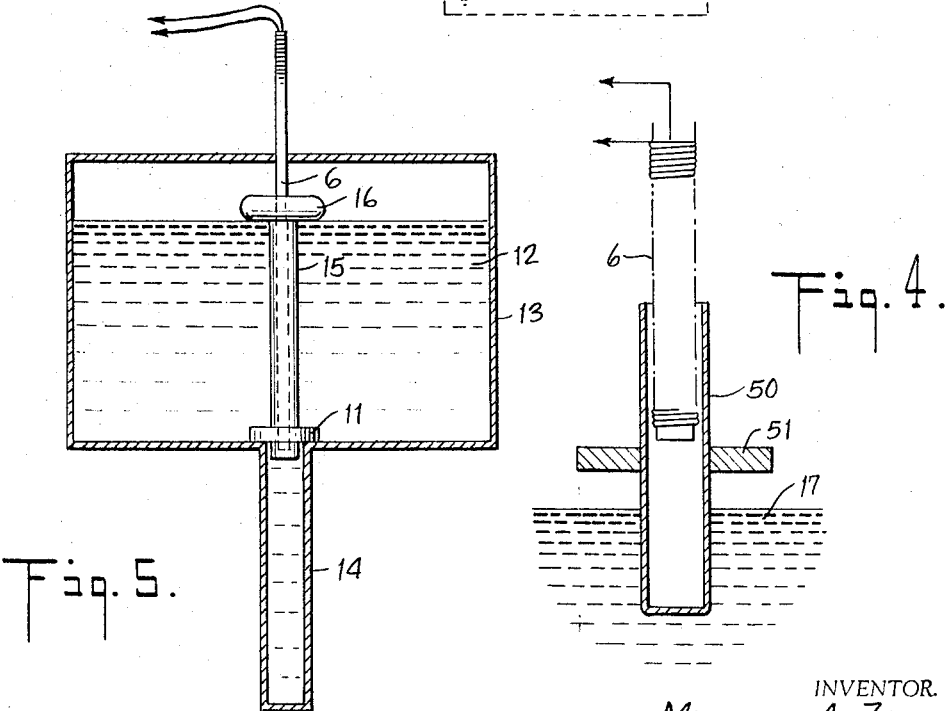
INVENTOR.
MICHAEL A. ZINIUK
BY
Ward, Neal, Haselton, Orme & McElhanno
ATTORNEYS

United States Patent Office 3,296,862
Patented Jan. 10, 1967

3,296,862
FLUID LEVEL MEASURING APPARATUS
Michael A. Ziniuk, Melvindale, Mich., assignor to Atomic Power Development Associates, Inc., Detroit, Mich., a corporation of New York
Filed Oct. 2, 1963, Ser. No. 313,224
6 Claims. (Cl. 73—290)

This invention relates to fluid level measuring methods and apparatus and particularly to methods and apparatus employing an electrical delay line and electrical pulses for the measurement of the level of a fluid.

Various forms of apparatus for measuring the level of a fluid are well known in the art, but many of such forms are not completely suitable for the remote and rapid indication fluid level and are not suitable for use in measuring the level of high temperature or corrosive fluids. In addition, sometimes the equipment to be operated by the level of the fluid is relatively complicated mechanically or electrically and/or requires substantial space or special mounting facilities. It is an object of this invention to provide fluid level measuring apparatus and methods which eliminate certain of the problems of the prior art apparatus and which are suitable for use in measuring the level of high temperature and/or corrosive fluids.

Distributed and lumped parameter transmission lines are well known and are sometimes called, and will hereinafter be identified, as delay lines. It is also known that when an electrical pulse is applied to one end thereof, (sometimes called the near end) pulse energy will travel along the line at a rate dependent upon the electrical characteristics of the line, and if the line is terminated at its far end in a non-matching impedance, pulse energy will be reflected at the far end and will return to the near end at a time dependent upon the length and electrical characteristics of the line intermediate the near end and the discontinuity or mismatch at the far end. In addition, it is known that a pulse energy reflecting discontinuity can be produced at any point along an unshielded delay line by changing the electrical impedance at such point by means of a good electrical conductor placed in close proximity to the line at such point.

In accordance with my invention, the above-described phenomena are employed in determining the level of a fluid, either conductive or non-conductive, by controlling the relative positions of a delay line and a conductive discontinuity producing member, which if the fluid is sufficiently conductive, may be the fluid itself, in accordance with the level of the fluid, and measuring the time required for pulse energy to be reflected at the discontinuity. Since the time is directly related to the position of the discontinuity along the line, such time measurement is a direct measure of the fluid level.

In the preferred form of the invention the delay line is a distributed parameter transmission line which may be formed simply by winding an insulated wire spirally around a suitable form. If the invention is to be employed in the measurement of the level of high conductivity liquid metal, where the invention has particular application, the line preferably is encased (at least the portion thereof which is to contact the liquid metal) in a relatively low conductivity metal sheath, such as a stainless steel sheath. When used in the measurement of relatively low conductivity liquids without the use of a metal sheath therearound, the line preferably is encased in a non-conductive sheath, such as a sheath of ceramic, polytetrafluoroethane, or other plastic.

Although various forms of measuring apparatus may be employed with the invention, the preferred form of the invention includes measuring apparatus which will permit remote indication of the fluid level and, therefore, preferred forms of such measuring apparatus will be disclosed herein.

One object of the invention is to provide a new use of known types of apparatus in the measuring of the level of fluids.

It is a further object of the invention to provide simple and reliable fluid level measuring apparatus which is accurate and quick-acting and which is readily adaptable for remotely indicating the fluid level.

Other objects of the invention will be apparent from the following detailed description of the preferred embodiments thereof, which description should be considered in conjunction with the accompanying drawings, in which:

FIG. 3 is a combined block and schematic diagram illustrating a modified form of measuring apparatus;

FIG. 4 is a partly schematic side elevation view, partly in cross section, of a modified form a portion of the apparatus for measuring the fluid level; and FIG. 5 is a partly schematic side elevation view, partly in cross section, of a further modified form of a portion of the apparatus for measuring the fluid level.

Figure 1:
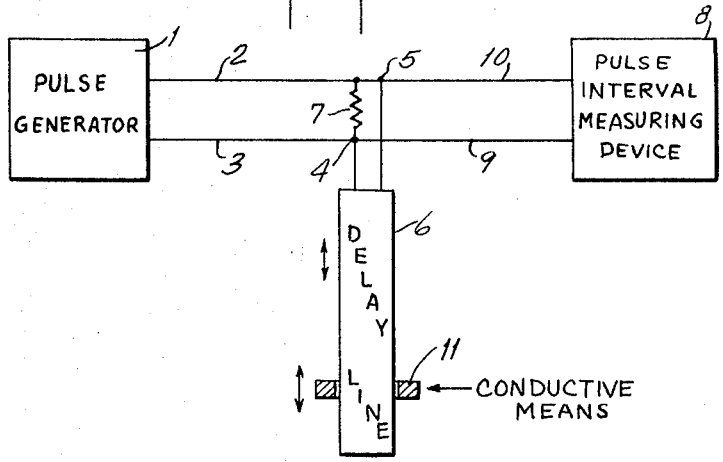
FIG. 1 is a block diagram illustrating the principles of the invention.

FIG. 1 illustrates a pulse generator 1 connected by a pair of lines 2 and 3 to the input terminals 4 and 5 of a delay line 6 which may be of any well known type, but which preferably is constructed by winding a single layer of insulated wire helically around a metal tube having a longitudinal slit to minimize eddycurrent losses in the tube. For example, the delay line 6 may have an outside dimension of approximately three-fourths inch in diameter and is slightly longer than the maximum fluid level displacement to be measured. One such delay line made and tested by me had a propagation velocity of sixty miles per second, which represents a one-way time delay of approximately three microseconds per foot.

A matching impedance 7 is connected in parallel with the input terminals 4 and 5 of the delay lines 6 and a pulse interval measuring device 8 is connected by leads 9 and 10 to the terminals 4 and 5. Such pulse interval measuring device may be one of the forms of apparatus described in further detail hereinafter or any other well known pulse interval measuring device such as an oscilloscope.

The delay line 6 is encircled by a highly conductive ring 11 which may, for example, be a ring of copper having an internal diameter slightly greater than the external diameter of the delay line 6 so as to permit movement of the delay line 6 with respect to the ring 11, or vice versa.

The pulse generator 1 preferably produces periodic pulses at a low rate, such as thirty pulses per second, which have a time duration which is short relative to the time interval between pulses and which is short compared to the time taken for the pulse to travel from the terminals 4 and 5 to the opposite end of the delay line 6 and reutrn. The pulse may, for example, be in the range from one-tenth to ten micro-seconds. Also, preferably, the time interval between the pulses is greater than the round trip time of a pulse applied to the terminals 4 and 5 and transmitted along the delay line 6. The far end of the delay line 6, that is, the far end thereof, most remote from the terminals 4 and 5, may be terminated in a matching impedance, but alternatively, it may be short-circuited or open-circuited, preferably the former.

The pulse interval measuring device 8 is synchronized with the pulse generator 1, and when a pulse from the generator 1 is applied to the terminals 4 and 5, it is transmitted along the line 6 and at least a portion of the energy thereof is reflected at the position of the ring 11 which forms a discontinuity along the delay line 6. The pulse energy reflected at the position of the ring 11 arrives at the terminals 4 and 5 at a time after the application of the initial pulse to the terminals 4 and 5, dependent upon the relative positions of the delay line 6 and the ring 11, and the time interval is indicated by the measuring device 8. Since the propagation velocity of the delay line 6 has been determined and is known, then the distance of the ring 11 from the near end of the line is determined from the following formula:

$$d = \frac{t}{2} v$$

where $d$ is the distance of the ring 11 from the near end
$t$ is the time interval between corresponding points on the applied and reflected pulses
$v$ is the propagation velocity.

Accordingly, the time interval between the corresponding points on the applied pulse and the reflected pulse is a direct measure of the relative positions of the line 6 and the ring 11.

The delay line 6 may be maintained in a known fixed position and the ring 11 may be moveable in accordance with the level of the fluid to be measured. Alternatively, if the fluid whose level is to be measured is of good conductivity, such as 0.5 mho or higher, the fluid itself may take the place of the ring 11 and, therefore, the ring 11 may be omitted.

If desired, the ring 11 may be maintained in a known fixed position and the delay line 6 may be moved in accordance with the level of the fluid as is illustrated in FIG. 5. FIG. 5 illustrates a low conductivity fluid 12 contained in a tank 13 having an extension 14 for receiving the delay line 6 contained in a non-conducting sheath 15 supported at its upper end by a float 16. The ring 11 is mounted at the bottom of the tank 13 around the entrance to the extension 14 so that the position of the ring 11 with respect to the line 6 depends upon the level of the fluid 12 which causes the line 6 to move up or down depending upon the level of the fluid 12.

The methods and apparatus of the invention are particularly applicable to he measurement of the level of liquid metals which are encountered in nuclear reactors and the delay line offers a combination of functional and physical characteristics which make it particularly adapted for the environment found in nuclear reactors. Thus, it is simple in structure and may be shielded by materials which will withstand the conditions including temperature which are encountered. The apparatus permits the measurement of a wide range of fluid levels, a high degree of resolution, linearity and accuracy of the order of 0.5% and in-position calibration. For use in the measurement of the level of liquid metals which have a relatively high conductivity, the delay line may be enclosed in a sheath of relatively high resistivity, corrosion resistant non-magnetic metal, such as Inconel (an 80% nickel, 5% iron and 15% chromium alloy) or type 304 stainless steel.

When such a metal sheath is employed, it modifies the characteristics of the delay line, but satisfactory operation is obtainable if the sheath thickness is small and relatively longer duration pulses are employed. A stainless steel sheath having a wall thickness of 0.010 inch has been found to give adequate sensitivity with a pulse duration of ten micro-seconds.

Figure 2:
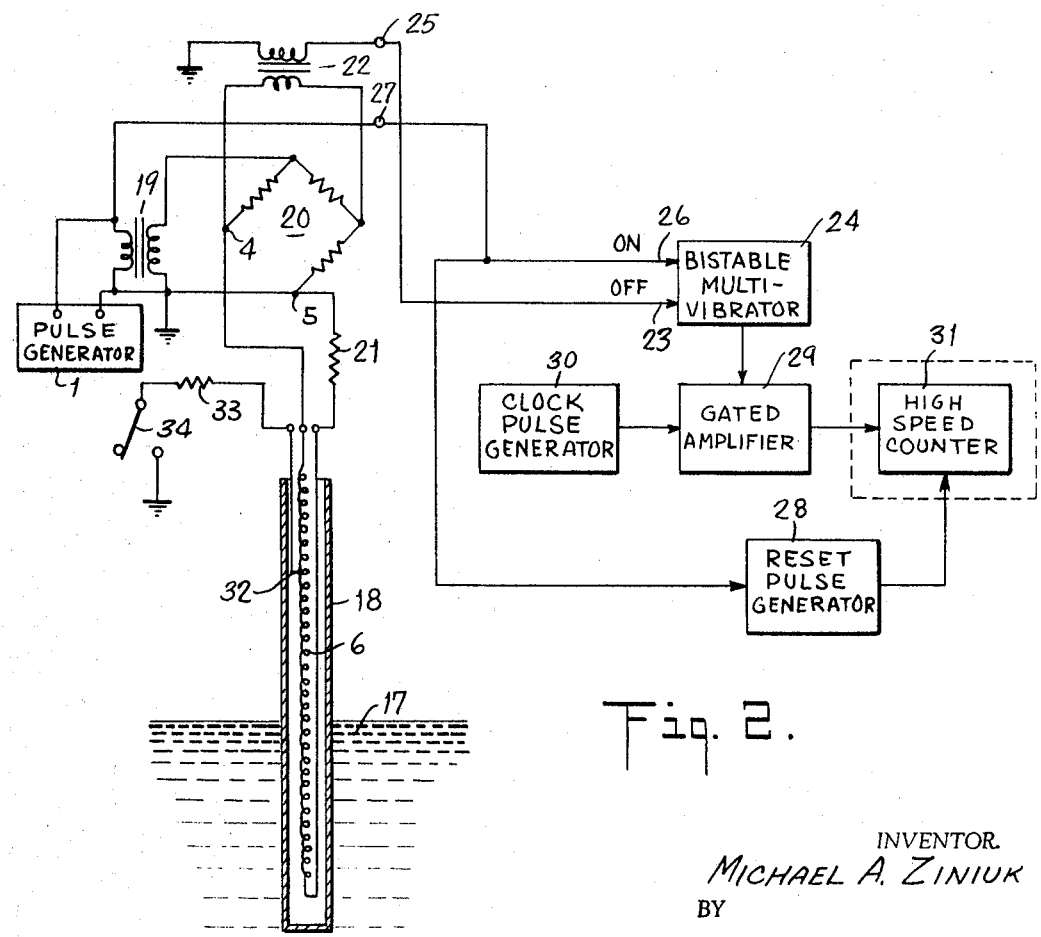
FIG. 2 is a combined block and schematic diagram illustrating one preferred form of the invention.

FIG. 2 illustrates the use of the methods and apparatus of my invention in conjunction with the measurement of the level of a liquid metal 17, the delay line 6 being enclosed in a sheath of the type described above, i.e., a stainless steel sheath 18, and immersed in the liquid metal 17. The pulse generator 1 is coupled by means of a transformer 19 to the diagonally opposite terminals of a bridge or isolating circuit 20, one arm of which is formed by the delay line 6 in series with a resistor 21. The purpose of the bridge or isolating circuit 20 is to permit the time interval measuring apparatus to distinguish between the initially applied pulse and the reflected pulse energy.

The other pair of diagonally opposite points of the bridge or isolating circuit 20 are coupled by means of a transformer 22 to the off-input 23 of a bi-stable multivibrator 24 by way of a terminal 25. The on-input 26 of the multivibrator 24 is connected to the output of the pulse generator 1 by way of a terminal 27. The input of a reset pulse generator 28 is also connected to the terminal 27.

The bi-stable multivibrator 24 controls a gated amplifier 29 which is connected intermediate a clock pulse generator 30 and a high speed counter 31 which may be located adjacent to the position at which the fluid whose level is to be measured is located, but preferably, under the assumed conditions, it is located remotely from the fluid such as in the control room associated with the nuclear reactor.

When the pulse from the pulse generator 1 is applied to the delay line 6 it travels toward the far end of the line 6 and at least a portion of the energy thereof is reflected at the upper level of the fluid 17. The pulse from the generator 1 which is also applied to the on-input of the multivibrator 24 also causes opening of the gated amplifier 29 which permits pulses from the clock pulse generator 30, which are accurately controlled to pass to the high speed counter 31, where they are counted. Immediately prior to the opening of the gated amplifier 29, the reset pulse generator 28 resets the high speed counter 31 to its normal or zero count.

When the reflected pulse energy arrives at the terminals 4 and 5, it is transmitted by way of the transformer 22 to the off-input of the multivibrator 24, closing the gated amplifier 29 and thereby terminating the transmission of the clock pulses from the generator 30 to the counter 31. Accordingly, the count indicated by the counter 31 will be a direct indication of the level of the fluid 17. If, for example, the frequency of the generator 30 is 25 megacycles per second, the delay line 6 is eight feet long and the two-way delay for such a line is 35 micro-seconds, the number of counts for the lowest measurable level of the fluid would be 875. This represents a resolution of 875/8 or roughly 100 counts per foot, which provides a high degree of resolution.

In-position calibration of the system can be accomplished with a tap 32 located at a known position, such as one foot from the near end, on the delay line 6. Such tap may be connected through a resistor 33 and a switch 34 which, in the open position shown in FIG. 2, has no effect on the delay line 6, but which in the alternate position thereof connects the tap 32 to ground and thereby provides a pulse reflecting discontinuity at a known position on the delay line 6. During a calibration check, the tap 32 would be shorted to ground through the switch 34 and a reflected pulse representing a known length of line is produced and the frequency of the clock pulse generator 30 may be adjusted so as to provide an indication on the counter 31 which corresponds to the known position of the tap 32.

An alternate form of the measuring apparatus is illustrated in FIG. 3 and is shown connected to the terminals 25 and 27 which are the same as the terminals 25 and 27 shown in FIG. 2. Accordingly, the apparatus to the left of the terminals 25 and 27 in FIG. 3 is the same as the apparatus shown to the left of the terminals 25 and 27 in FIG. 2.

In the measuring apparatus illustrated in FIG. 3, the pulse initially applied to the input of the delay line 6 is supplied by way of the terminal 27 to the on-inputs of first and second bi-stable multivibrators 35 and 36 and to the input of a variable delay liine 37. After a delay determined by the setting of the line 37, such pulse is supplied to the off-input of the multivibrator 36. The reflected pulse energy, that is, the energy reflected because of a discontinuity along the lines such as the ring 11 or the fluid 17 along the delay line 6, is supplied by way of the terminal 25 to the off-input of the multivibrator 35. The output pulses of the multivibrators 35 and 36 are supplied to the input of a known type of summing circuit 57 which provides an output pulse having a polarity and time width which is dependent upon the time separation between the input pulses supplied to the input thereof. The output of the summing circuit 57 is connected through a pair of oppositely poled diodes 38 and 39 to the inputs of a pair of mono-stable multivibrators 40 and 41 which supply output pulses for driving a stepper motor 42 in respectively opposite directions. The stepper motor 42 is connected through a suitable gear reduction device 43 to the adjustable control 44 of the delay line 37 and to the arm 45 of a potentiometer 46. The potentiometer 46 is connected in series with an adjustable calibrating resistor 47 and to a source of constant potential such as a mercury battery 48. A D.C. potential operable digital volt meter 49 is connected to the arm 45 and to the junction point of the potentiometer 46 and the resistor 47 so that it provides an output indication dependent upon the position of the arm 45. The indicator of the volt meter 49 may be calibrated so as to read the fluid level directly and the volt meter 49 may be located adjacent to the fluid whose level is being measure or it may be located remotely therefrom.

When the pulse initially applied to the delay line 6 is supplied to the multivibrators 35 and 36, the multivibrators 35 and 36 supply pulses commencing substantially at the same instant to the summing circuit 57. The reflected pulse energy terminates the pulse supplied by the multivibrator 35 and the delayed pulse supplied by the delay line 37 terminates the pulse supplied by the multivibrator 36. If the output pulses 35 and 36 are of the same duration, then there is no output from the summing circuit 57 and the motor 42 remains at rest. However, if the duration of the output pulse of the multivibrator 36 is different from the duration of the pulse supplied by the multivibrator 35, then the summing circuit 57 supplies a pulse of a polarity and duration dependent upon the difference in the time of arrival of the reflected pulse energy at the multivibrator 35 and the delayed pulse supplied to the multivibrator 36. Thus, if the reflected pulse from the delay line 6 arrives earlier than the pulse from the delay line 37, the output of the summing circuit 57 will be of a first polarity and conversely, if the reflected pulse from the delay line 6 arrives later than the delay line 37, the output of the summing circuit 57 will be of an opposite polarity. Accordingly, when there is a difference in the time of arrival of the reflected pulse and the delayed pulse, the motor 42 will be operated by the multivibrators 40 and 41 to cause the arm 44 to move until the arrival of the reflected pulse and the delayed pulse are substantially coincident. Since the motor 42 also moves the arm 45, the voltage applied to the digital volt meter 49 will be proportional to the level of the fluid being measured.

The reading of the digital volt meter 49 may be calibrated in the manner set forth above in connection with the calibration of the apparatus shown in FIG. 2, the variable resistor 47 being adjusted to provide a reading on the volt meter 49 corresponding to the known position of the tap 32.

Instead of maintaining the delay line 6 with a portion thereof immersed in the fluid 17, the delay line 6 may be held in a fixed position above the uppermost level of the fluid 17 as illustrated in FIG. 4 and may be surrounded by a tube 50 which floats in the fluid 17 and is guided by a guide 51. The tube 50 may be made entirely of highly conductive material such as copper, or it may be made of a highly conductive material only at the upper end thereof as viewed in FIG. 4. Such an arrangement is particularly useful when it is desired to keep the delay line 6 out of contact with the fluid 17 or it is desired to eliminate a sheath around the delay line 6. The tube 50 serves the same function as the ring 11, the relative positions of the tube 50 and the delay line 6 being a measure of the level of the fluid 17. The arrangement of FIG. 4 is particularly useful when the fluid 17 is of a low conductivity because the reflected pulse energy is independent of the conductivity of the fluid 17.

Also, the ararngement shown in FIG. 5 may be modified by inverting the delay line 6 and maintaining it in a fixed position extending upwardly from the bottom of the tank 13, and the ring 11 may be carried by the float 16. However, in this case, the highest level of the fluid would be indicated by the longest, rather than the shortest, interval between the applied and reflected pulses.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A fluid level detector comprising a relatively long and narrow electrical delay line mounted with its length extending substantially perpendicular to the surface of the fluid, the level of which is to be detected, and supported by said fluid, a high conductivity member mounted in a fixed position with respect to said fluid and having an aperture for receiving said line, said line having an input located remotely from said member, means for applying an electrical pulse to said input, and means for measuring the time interval between said pulse and the pulse energy reflected at the discontinuity in said line caused by said member.

2. A fluid level detector comprising a relatively long and narrow electrical delay line mounted in a fixed position with its length extending substantially perpendicular to the surface of the fluid, the level of which is to be detected, a high conductivity member supported by said fluid and having an aperture for receiving said line, said line having an input located remotely from said member, means for applying an electrical pulse to said input, and means for measuring the time interval between said pulse and the pulse energy reflected at the discontinuity in said line caused by said member.

3. Fluid level measuring apparatus comprising a relatively long and narrow electrical delay line having a low conductivity shield therearound and immersed in a conductive fluid with its length extending in the direction of movement of the level of said fluid, a pulse generator for generating periodic electrical pulses having a time width which is short relative to the time interval between said pulses; a pulse time measuring circuit comprising means having on and off inputs and means for measuring the time interval between the application of pulses to said inputs; means connecting said on input to said pulse generator; and an isolating circuit interconnecting said pulse generator with the input of said delay line and interconnecting said input of said delay line with said off input of said measuring circuit, said isolating circuit preventing the transmission of pulses from said first-mentioned pulse generator to said off input.

4. Fluid level measuring apparatus comprising a relatively long and narrow electrical delay line having a low conductivity shield therearound and immersed in a conductive fluid with its length extending in the direction of movement of the level of said fluid, a first pulse generator for generating periodic electrical pulses having a time width which is short relative to the time interval between said pulses; a pulse measuring circuit comprising a second pulse generator for generating pulses having a variable width, said second pulse generator having its on input connected to said first pulse generator and having a pulse width control, a third pulse generator having a pair of inputs for generating pulses having a width dependent upon the time interval between the application of pulses of said inputs, one of said inputs being connected to said first pulse generator, a comparing circuit connected to the outputs of said second and third generators for comparing the output pulses thereof, servo means connected to said comparing circuit and to said control of said second generator for controlling said second generator in accordance with the output of said comparing circuit and means for indicating the position of said pulse width control; and an isolating circuit interconnecting said first pulse generator with the input of said delay line and interconnecting said input of said first-mentioned delay line with the other of said inputs of said third pulse generator, said isolating circuit preventing the transmission of pulses from said first pulse generator to said other input of said third pulse generator.

5. Fluid level measuring apparatus comprising a relatively long and narrow electrical delay line having a low conductivity shield therearound and immersed in a conductive fluid with its length extending in the direction of movement of the level of said fluid, a pulse generator for generating periodic electrical pulses having a time width which is short relative to the time interval between said pulses; a pulse measuring circuit comprising first and second bi-stable multivibrators having on and off inputs and each having its on input connected to said generator, a summing circuit connected to the outputs of said multivibrators for comparing the output signals thereof, a second delay line interconnecting said pulse generator and the off input of said second multivibrator, said second delay line having a control for varying the time delay thereof, a voltage source having a control for varying the voltage output thereof, indicating means connected to said voltage source, and servo means connected to said summing circuit and to said control of said second delay line and to said control of said voltage source for controlling said second delay line and said voltage source in accordance with the output of said summing circuit; and an isolating circuit interconnecting said pulse generator with the input of said first-mentioned delay line and interconnecting said input of said first-mentioned delay line with said off input of said first multivibrator, said isolating circuit preventing the transmission of pulses from said first-mentioned pulse generator to said off input of said first multivibrator.

6. Fluid level measuring apparatus comprising a relatively long and narrow electrical delay line having a low conductivity shield therearound and immersed in a conductive fluid with its length extending in the direction of movement of the level of said fluid, a pulse generator for generating periodic electrical pulses having a time width which is short relative to the time interval between said pulses; a pulse time measuring circuit comprising a bi-stable multivibrator having on and off inputs and having its on input connected to said generator, a gate circuit controlled by said multivibrator and which is open when said multivibrator is on, and a pulse counter and a clock pulse generator interconnected by said gate circuit whereby pulses of said clock pulse generator are counted by said counter when said gate is open, said counter having a reset input connected to said first-mentioned pulse generator; and an isolating circuit interconnecting said first-mentioned pulse generator with the input of said delay line and interconnecting said input of said relay line with said off input of said multivibrator, said isolating circuit preventing the transmission of pulses from said first-mentioned pulse generator to said off input.

References Cited by the Examiner

UNITED STATES PATENTS

| 2,525,893 | 10/1950 | Gloess. | |
|---|---|---|---|
| 3,127,578 | 3/1964 | Long | 333—29 X |
| 3,208,281 | 9/1965 | Kalmus et al. | 73—313 |

FOREIGN PATENTS 873,538  7/1961  Great Britain.

LOUIS R. PRINCE, *Primary Examiner.*

S. C. SWISHER, *Assistant Examiner.*

UNITED STATES PATENT OFFICE
CERTIFICATE OF CORRECTION

Patent No. 3,296,862                        January 10, 1967

Michael A. Ziniuk

It is hereby certified that error appears in the above numbered patent requiring correction and that the said Letters Patent should read as corrected below.

Column 3, line 3, for "reutrn" read -- return --; line 61, for "he" read -- the --; column 5, line 15, for "liine" read -- line --; line 44, for "measure" read -- measured --; column 6, line 24, for "ararngement" read -- arrangement --; column 8, line 33, for "relay" read -- delay --.

Signed and sealed this 24th day of October 1967.

(SEAL)
Attest:

Edward M. Fletcher, Jr.
Attesting Officer

EDWARD J. BRENNER
Commissioner of Patents